US006224956B1

(12) United States Patent
Shah

(10) Patent No.: US 6,224,956 B1
(45) Date of Patent: May 1, 2001

(54) BREATHABLE ABUSE RESISTANT FILM FOR PACKAGING CHEESE

(75) Inventor: Gautam P. Shah, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/153,552

(22) Filed: Nov. 16, 1993

Related U.S. Application Data

(63) Continuation of application No. 07/652,761, filed on Feb. 8, 1991, now abandoned, which is a continuation-in-part of application No. 07/525,416, filed on May 17, 1990, now abandoned.

(51) Int. Cl.$^7$ ............................. B25D 22/00; B32B 1/08
(52) U.S. Cl. ................. 428/36.6; 428/36.7; 428/474.4; 428/475.5; 428/475.8; 428/476.3; 428/521; 428/336
(58) Field of Search ................. 428/36.6, 36.7, 428/336, 474.4, 475.5, 475.8, 476.3, 521

(56) References Cited

U.S. PATENT DOCUMENTS

| 4,105,818 | * | 8/1978 | Sholle ................... 428/192 |
| 4,361,628 | | 11/1982 | Krueger et al. ........... 428/475.8 |
| 4,552,714 | | 11/1985 | Krueger et al. ........... 264/173.14 |
| 4,588,648 | | 5/1986 | Krueger et al. ........... 428/475.8 |
| 4,612,221 | | 9/1986 | Biel et al. ............... 428/35.4 |
| 4,617,240 | | 10/1986 | Krueger et al. ........... 428/476.1 |
| 4,724,185 | * | 2/1988 | Shah ..................... 428/339 |
| 4,726,984 | * | 2/1988 | Shah ..................... 428/216 |
| 4,800,129 | * | 1/1989 | Deak .................... 428/474.4 |

FOREIGN PATENT DOCUMENTS

| 0086339 | 10/1982 | (AU) . |
| 0115163 | 8/1984 | (EP) . |
| 0204324 | 12/1986 | (EP) . |
| 0207719 | 1/1987 | (EP) . |
| 0239092 | 9/1987 | (EP) . |
| 0288972 | 11/1988 | (EP) . |
| 0305146 | 3/1989 | (EP) . |
| 0318964 | 6/1989 | (EP) . |
| 180235 | * 12/1977 | (NZ) . |

OTHER PUBLICATIONS

US Anionic Polymerization . . . Encyclopiedia of Polymer Science and Engineering vol. 2—177–192, 1985.*

* cited by examiner

Primary Examiner—Leszek Kiliman
(74) Attorney, Agent, or Firm—Mark B. Quatt

(57) ABSTRACT

A polymeric film is provided which comprises a core layer of polyamide and two outer layers of ethylene propylene copolymer, polypropylene, and blends thereof. Coextruded embodiments include intermediate adhesive layers. A preferred embodiment of the multilayer film exhibits a combination of good abuse resistance and oxygen barrier properties, as well as excellent optical properties and shrink properties. The differential in $CO_2$ transmission and $O_2$ transmission rates makes these films especially useful in cheese packaging applications.

19 Claims, 1 Drawing Sheet

BREATHABLE ABUSE RESISTANT FILM FOR PACKAGING CHEESE

This application is a Continuation of application Ser. No. 07/652,761, filed on Feb. 8, 1991, now abandoned, which in turn is a Continuation-in-Part of application Ser. No. 07/525,416, filed May 17, 1990, now abandoned.

FIELD OF THE INVENTION

This invention relates to packaging films, and more particularly to a multilayer film having a combination of relatively low oxygen transmission, relatively high carbon dioxide transmission, and good abuse resistance characteristics.

BACKGROUND OF THE INVENTION

Thermoplastic film, and in particular polyolefin materials, have been used for some time in connection with packaging of various articles including food products which require protection from the environment, an attractive appearance, and resistance to abuse during the storage and distribution cycle. Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product. Various polymeric materials have been used to provide lower gas permeability in order to reduce the transmission of oxygen through the packaging film and thereby retard the spoilage and extend the shelf life of products such as food items which are sensitive to oxygen.

In some packaging applications, such as the packaging of roasted chicken and pizza, it is desirable to provide a packaging film with a combination of high abuse resistance and good oxygen barrier properties. This combination of properties provides adequate physical protection for the packaged item during storage and distribution, as well as the necessary shelf life.

Some cheese products are produced in such a way that the final cheese product emits a significant amount of carbon dioxide over time. In such cases, it is often desirable to provide a packaging material which is characterized by a relatively low oxygen transmission rate (i.e. good oxygen barrier), and a relatively high carbon dioxide transmission rate. A preferred $O_2$ transmission rate is no more than about 500 cc/square meter (ASTM D 3985), more preferably no more than about 250 cc/square meter. A preferred $CO_2$ transmission rate is at least about 750 cc/square meter, more preferably at least about 1000 cc/square meter, most preferably at least about 1200 cc/square meter. The ratio of $CO_2$ transmission rate to $O_2$ transmission rate is preferably greater than about 1:1, more preferably at least about 3:1, and most preferably at least about 5:1.

It is also often desirable to include in a packaging film a shrink feature, i.e, the propensity of the film upon exposure to heat to shrink or, if restrained, create shrink tension within the packaging film. This property is imparted to the film by orientation of the film during its manufacture. Typically, the manufactured film is stretched in either a longitudinal (machine) direction, a transverse direction, or both, in varying degrees to impart a certain degree of shrinkability in the film upon subsequent heating. After being so stretched, the film is rapidly cooled to provide this latent shrinkability to the resulting film. One advantage of shrinkable film is the tight, smooth appearance of the wrapped product that results, providing an aesthetic package as well as protecting the packaged product from environmental abuse. Various food and non-food items may be and have been packaged in shrinkable films.

It is sometimes also desirable to orient a packaging film and thereafter heat set the film by bringing the film to a temperature near its orientation temperature. This produces a film with substantially less shrinkability, while retaining much of the advantages of orientation, including improved modulus and optical properties.

Of interest are U.S. Pat. Nos. 4,361,628, and 4,552,714, as well as 4,588,648 and 4,617,240 (Krueger et al) which disclose asymmetric films having polypropylene and nylon bonded by a polypropylene-based adhesive layer.

Also of interest is U.S. Pat. No. 4,726,984 (Shah) disclosing an oxygen barrier oriented film with a core layer of ethylene vinyl alcohol copolymer; two intermediate adhesive layers; and two outer layers of a blend of ethylene propylene copolymer and polypropylene.

It is an object of the present invention to provide a coextruded thermoplastic multilayer film characterized by a combination of good oxygen barrier and good abuse resistance properties It is another object of the invention to provide a polymeric film characterized by a relatively low oxygen transmission rate, and a relatively high carbon dioxide transmission rate.

It is a further object of the present invention to provide a thermoplastic multilayer film having an aesthetic appearance with good clarity, and other desirable optical properties.

It is another object of the present invention to provide a thin thermoplastic multilayer film having superior toughness and abrasion resistance.

It is still another object of the present invention to provide a coextruded thermoplastic multilayer film which may be totally coextruded, and oriented to provide a film with good shrink properties and good oxygen barrier and abuse resistance properties over a wide range of moisture conditions.

It is yet another object of the present invention to provide a coextruded thermoplastic film which is oriented yet substantially shrink-free.

SUMMARY OF THE INVENTION

The present invention relates to a polymeric film comprising a core layer comprising a polyamide; and two outer layers comprising a blend of between about 0% and 100% ethylene propylene copolymer, and between about 100% and 0% polypropylene.

In another aspect of the invention, a method of making a polymeric film comprises the steps of blending ethylene propylene copolymer and polypropylene, and coextruding an inner layer of polyamide between two outer layers of the blend of ethylene propylene copolymer and polypropylene to form a multilayer film.

The present invention also encompasses a multilayer film comprising a core layer comprising a polyamide; and two outer layers comprising ethylene propylene copolymer, polypropylene, or blends thereof; the film having an oxygen transmission rate of no higher than about 500 cc/square meter (ASTM D3985).

The present invention also encompasses a multilayer film comprising a core layer comprising a polyamide; and two outer layers comprising ethylene propylene copolymer, polypropylene, or blends thereof; the film having a carbon dioxide transmission rate of at least about 750 cc/square meter.

In still another aspect of the invention, a multilayer film comprises a core layer comprising a polyamide; and two outer layers comprising ethylene propylene copolymer, polypropylene, or blends thereof; said film having a carbon dioxide transmission rate greater than the film's oxygen transmission rate.

DEFINITIONS

"Intermediate layer" and the like is used herein to define a layer in a multilayer film enclosed on both sides by other layers.

The term "oriented" and the like is used herein to define a polymeric material in which the molecules have been aligned by a process such as racking or blown bubble process.

"Polyamide" herein means resins well known in the art including those commonly designated as nylons. Especially preferred are those polyamides which contribute substantially to the oxygen barrier properties of the film. These include, but are not limited to, polyamides such as polycaprolactam (nylon 6), and copolyamides. A preferred copolyamide is the copolyamide made up of hexamethylene adipamide and caprolactam, i.e. nylon 6/66.

"Racking" as used herein is a well-known process for stretching coextruded and reheated multilayer film by means of center framing or blown bubble processes.

BRIEF DESCRIPTION OF THE DRAWINGS

Further details are given below with reference to the sole drawing FIGURE wherein.

DESCRIPTION OF THE PREFERRED EMBODIMENTS

Figure 1:
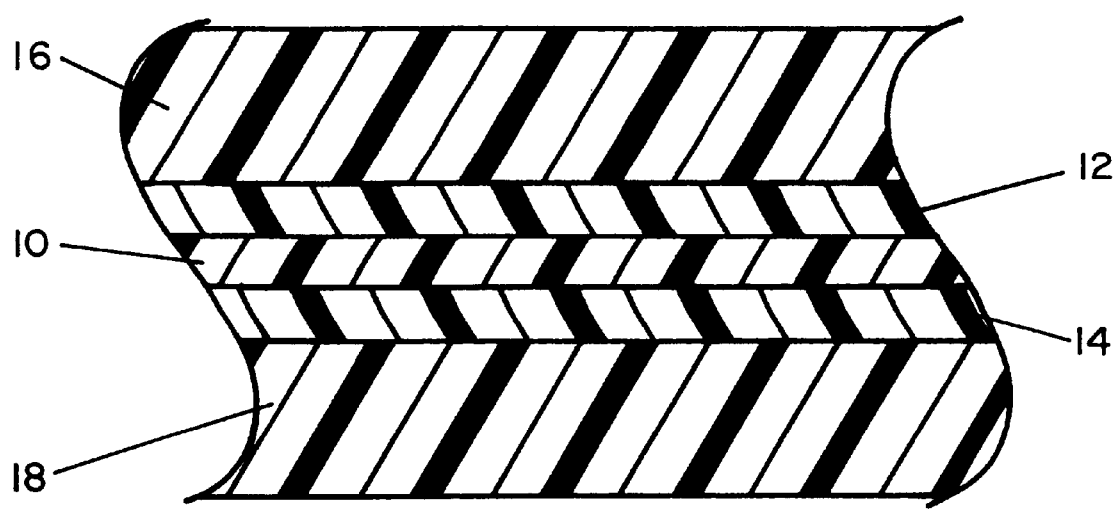
FIG. 1 is a schematic cross section of a preferred embodiment of a multilayer film of the invention.

Referring specifically to the drawings, in FIG. 1, a schematic cross section of a preferred embodiment of the coextruded multilayer oriented film of the invention is shown. Film structure is directed to a multilayer film having the generalized structure of A/B/C/B/A where A is an outer layer, B is an intermediate adhesive layer, and C is a core layer of a barrier material. Core layer 10 is a polyamide. Intermediate layers 12 and 14 are preferably carboxylic acid or acid anhydride-modified polyolefins and more preferably polypropylene-based carboxylic acid or acid anhydride-modified polyolefins. Outer layers 16 and 18 are preferably a blend of ethylene propylene copolymer (EPC) and polypropylene (PP). These blend layers may include from 0–100% EPC and 100%–0% PP, although preferably the blend layers include between about 96% and 85% EPC and between about 15% and 4% PP; even more preferably, the blend layer includes about 92% EPC and 8% PP.

Conventional lamination techniques can be used to bond the core layer of polyamide to the outer layers of propylene polymer and/or copolymer. Thus, the film can be produced without the need for intermediate polymeric adhesive layers. Other extrusion and extrusion coating methods can also be used to produce the films of the present invention.

EXAMPLE 1

Ethylene propylene copolymer (Norchem PP 3303 GK) was blended with polypropylene (Himont PDO 64). The polypropylene was pre-blended with about 4% by weight of a silica-containing antiblocking agent, about 5% by weight of amide waxes, and about 1% of a lubricating agent. The amide waxes and lubricating agent are well known in the art as slip agents.

The ethylene propylene copolymer contained about 5% by weight ethylene, and was blended with the propylene in a blend ratio of about 92% by weight EPC and 8% by weight PP. (The PP percentage includes the additives discussed above).

A circular coextrusion die was fed with four extruders to prepare a five layer shrink film. Two extruders were used to feed the blend of EPC and polypropylene as a melt to the extrusion die to form the outer layers. Another extruder fed an ethylene polypropylene copolymer-based maleic anhydride-modified adhesive (Admer QF 55 1A) available from Mitsubishi to the extrusion die to provide the adhesive as intermediate layers in the multilayer film. The fourth extruder provided molten nylon 6/66 (Ultramid ° C-35 from BASF) to the extrusion die.

The extruded tape was rapidly cooled to room temperature and collapsed by pinch rolls. The tape was subsequently heated to its orientation temperature. Using a bubble technique well known in the art, internal air pressure stretched the tape to about 3.5 times its unstretched dimensions in both the longitudinal (machine) and transverse directions to form a bubble which provides biaxial orientation to the resulting film. The bubble was then rapidly cooled by chilled air in order to maintain the oriented state of the film. Finally, the bubble was collapsed and the expanded film gathered on a take-up roll. After orientation, the total wall thickness of the film was about one mil with about 50% of the structure being the blend of ethylene propylene copolymer and polypropylene; about 25% of the structure being the anhydride-modified adhesive layers; and the remainder or about 25% of the structure being the core polyamide layer.

It will be clear to one skilled in the art that the degree of stretching may be varied to obtain the desired degree of film gauge or thickness and to regulate the desired amount of shrink tension, free shrink, and other shrink properties of the final film, depending on the packaging application. Preferred stretching or racking ratios are between about 3.0 and 4.0 in both the machine and transverse directions.

EXAMPLE 2

A second multilayer shrink film was made by the same method described above, with the same resins, except that the total wall thickness of the film was about 90 gauge (0.9 mils) with about 52% of the structure being the blend of ethylene propylene copolymer and polypropylene; about 36% of the structure being the anhydride-modified adhesive layers; and the remainder or about 12% of the structure being the core polyamide layer.

EXAMPLE 3

A third multilayer shrink film was made by the same method and with the same composition described above, with a total thickness of about one mil. The outer layers comprised about 60% of the total thickness. The adhesive layers comprised about 25% of the total; the core polyamide layer about 15% of the total.

EXAMPLE 4

A fourth multilayer shrink film was made by the same method and composition described above, with a total thickness of about one mil. The outer layers comprised about 62% of the total film thickness. The adhesive layers comprised about 25% of the total; the core polyamide layer about 13% of the total film thickness.

EXAMPLE 5

A fifth multilayer film was made by the same method and composition described above, with a total thickness of about one mil. The outer layers comprised about 54% of the total film thickness. The adhesive layers comprised about 33% of the total film thickness. The core layer, comprising a blend of about 70% EVOH and about 30% polyamide, comprised about 14% of the total film thickness.

The films of the present invention provide heat sealable outer layers, and the orientation of the film provides toughness and improves the resistance to oxygen permeability.

An important feature of the film is its thinness. The multilayer film is preferably 0.5 to 4 mils thick, and more preferably 0.5 to 2 mils thick. One mil is equal to one thousands of an inch. It has been found that orienting the multilayer films of the present invention is increasingly difficult for thicknesses greater than 2 mils, and very difficult or impractical for thicknesses greater than 4 mils.

The blend ratios of the EPC and PP may be varied according to desired properties or end-use of the multilayer film. For example, increasing the polypropylene in the blend will add stiffness to the film, but also increase the sealing temperature of the film. Conversely, increasing the EPC in the blend tends to lower the shrink temperature of the oriented film, or to increase shrink at the same temperature, and also lowers the sealing temperature of the film. A preferred blend includes between about 4% and 15% PP and between about 96% and 85% EPC.

The multilayer film of the present invention is oriented either monoaxially or biaxially, and preferably used as a shrink film. Optionally, the oriented film may be further processed by reheating the film to a temperature near its orientation temperature, i.e. either somewhat below, at, or somewhat about its orientation temperature, to heat set the film. This future processing step has the advantage of substantially retaining many of the favorable physical characteristics of an oriented film, such as higher modulus and improved optical properties, while providing a substantial shrink-free film in applications where a shrink feature is undesirable.

The invention may be further understood by reference to the following tables. Table 2 compares various physical properties of the films of Examples 1–5 as well as several additional examples. Table 1 identifies the resins used in Table 2. In Table 1, "EEPC" means ethylene propylene copolymer; "MB" means masterbatch; "ADH" means adhesive; "NYLON" means polyamide or nylon; "EVOH" means ethylene vinyl alcohol copolymer; "EPB" means ethylene propylene butylene terpolymer; "LLDPE" means linear low density polyethylene; "IMDPE" means linear medium density polyethylene; and "EVA" means ethylene vinyl acetate copolymer.

TABLE 1

| ABBREVIATION | COMMERCIAL NAME | SUPPLIER |
| --- | --- | --- |
| $EPC_1$ = | FINA 8473 | FINA |
| $MB_1$ = | PP-Based Masterbatch | |
| $MB_2$ = | EVA-Based Masterbatch | |
| $ADH_1$ = | QF 551 | MITSUI |
| $ADH_2$ = | BYNEL E 331 | DU PONT |
| $ADH_3$ = | BYNEL E 204 | DU PONT |
| $NYLON_1$ = | C-35 | BASF |
| $NYLON_2$ = | GRILON CF 6 S | EMSER |
| $EVOH_1$ = | EVAL H | EVALCA |
| $EVOH_2$ = | EVAL EP H 103 B | EVALCA |
| $EVOH_3$ = | EVAL EC F101 A | EVALCA |
| $EPB_1$ = | EP 3C -37F | HIMONT |
| $LLDPE_1$ = | DOWLEX 2045 | DOW |
| $LMDPE_1$ = | DOWLEX 2037. 01 | DOW |
| $EVA_1$ = | PE 204-CS 95 | EL PASO |

Note:

$Nylon_2$ is a nylon 6/12.

$EPB_1$ is a terpolymer.

$MB_1$ is a masterbatch having about 90% polypropylene and about 10% antiblock and slip agents.

$MB_2$ is a masterbatch having about 90% ethylene vinyl acetate copolymer and about 10% antiblock and slip agents.

TABLE 2

| EXAMPLE NUMBER.: | | 1 | 2 | 3 | 4 | 5 | 6 | 7 | 8 |
| --- | --- | --- | --- | --- | --- | --- | --- | --- | --- |
| Structure | Where A = | A/B/C/B/A 92% $EPC_1$ + 8% $MB_1$ | A/B/C/B/A 92% $EPC_1$ + 8% $MB_1$ | A/B/C/B/A 92% $EPC_1$ + 8% $MB_1$ | A/B/C/B/A 92% $EPC_1$ + 8% $MB_1$ | A/B/C/B/A 92% $EPC_1$ + 8% $MB_1$ | A/B/C/B/A $EPB_1$ | A/B/C/B/A 50% $LLDPE_1$ + 25% $LMDPE_1$ + 25% $EVA_1$ | A/B/C/B/A 90% $LMDPE_1$ + 10% $MB_2$ |
| | B = and C = | $ADH_1$ $Nylon_1$ | $ADH_1$ $Nylon_1$ | $ADH_1$ $Nylon_1$ | $ADH_1$ $Nylon_1$ | $ADH_1$ 70% $EVOH_1$ + 30% $Nylon_1$ | $ADH_1$ $EVOH_2$ | $ADH_2$ 90% $EVOH_3$ + 10% $Nylon_2$ | $ADH_3$ 70% $Nylon_1$ + 30% $EVOH_3$ |
| Layer Ratio | | 2/1/2/1/2 | 2.2/1.25/1/ 1.25/2.2 | 2.4/1/1.2/ 1/2.4 | 2.5/1/1/1/ 2.5 | 2/1.25/1/ 1.25/2 | 2.4/1/1.2/ 1/2.4 | 3/1/1/1/3 | 2/1/2/1/2 |
| Tensile At Break[1] [psi] | $LD^2$ $TD^3$ | 20,480 19,410 | 15,890 14,740 | 16,240 17,970 | 15,490 16,730 | 15,280 14,130 | 15,240 14,340 | 12,120 11,460 | 17,890 17,610 |
| Elongation At Break[4] [%] | LD TD | 156 93 | 122 79 | 139 103 | 131 93 | 121 89 | 127 107 | 79 82 | 118 92 |
| Modulus[5] [psi] | LD TD | 126,300 143,300 | 111,400 130,700 | 126,800 130,600 | 122,200 128,000 | 147,500 139,600 | 161,600 157,600 | 98,200 94,500 | 103,000 97,800 |
| Tear | | | | | | | | | |

TABLE 2-continued

| EXAMPLE NUMBER.: | | 1 | 2 | 3 | 4 | 5 | 6 | 7 | 8 |
|---|---|---|---|---|---|---|---|---|---|
| Propagation[6] [gms] | LD | 7.25 | 5.12 | 6.46 | 5.76 | 5.28 | 6.60 | 17.74 | 13.87 |
| | TD | 7.67 | 4.10 | 5.60 | 5.24 | 4.60 | 7.03 | 19.26 | 15.55 |
| Free Shrinks [%][7]; Shrink Tension[8] [psi] @220° F. | LD | 16;461 | 16;384 | 16;401 | 16;407 | 24;452 | 20;406 | 24;402 | 15;363 |
| | TD | 19;570 | 19;528 | 19;530 | 19;523 | 24;477 | 24;470 | 30;467 | 20;559 |
| @240° F. | LD | 22;461 | 24;400 | 21;413 | 24;419 | 34;480 | 31;435 | 57;357 | 25;408 |
| | TD | 26;580 | 27;536 | 25;571 | 25;550 | 34;514 | 32;513 | 55;454 | 30;555 |
| @260° F. | LD | 33;482 | 38;420 | 34;445 | 35;429 | 48;477 | 48;483 | 64;396 | 46;405 |
| | TD | 36;584 | 41;544 | 37;556 | 38;551 | 47;520 | 48;533 | 65;429 | 49;575 |
| Ball Burst Impact[9] [ca-kg] | | 23.3 | 10.1 | 17.5 | 17.3 | 12.6 | 13.8 | 11.1 | 29.8 |
| Instrumented Impact, Peak Load [lbs] | | 25.6 | 14.0 | 18.6 | 18.0 | 16.5 | 20.1 | 22.9 | 26.8 |
| Haze[10] [%] | | 3.0 | 2.9 | 3.6 | 3.1 | 2.1 | 5.1 | 1.1 | 3.9 |
| Clarity[11] [%] | | 64 | 60 | 55 | 61 | 59 | 41 | 84 | 74 |
| Gloss[12], 45° | | 76 | 73 | 74 | 74 | 84 | 75 | 95 | 77 |
| Oxygen Transmission[13] [CCSTP/(24 HRS, SQ.M., ATM)] | | 201 | 492 | 339 | 349 | 4 | 3 | 3 | 53 |
| $CO_2$ Transmission[14] [CCSTP/(24 HRS., SQ.M., ATM)] | | 867 | 3278 | 1636 | 1705 | — | — | — | — |
| Ratio of $CO_2/O_2$ Transmission Rates | | 4.3 | | 6.7 | 4.8 | 4.9 | | | |

Notes:
[1] ASTM D 882
[2] LD = Longitudinal Direction
[3] TD = Transverse Direction
[4] ASTM D 882
[5] ASTM D 882
[6] ASTM D 1938
[7] ASTM D 2732
[8] ASTM D 2838
[9] ASTM D 3420
[10] ASTM D 1003 Method A
[11] ASTM D 1746
[12] ASTM D 2457
[13] ASTM D 3985
[14] Carbon dioxide transmission rates were determined using an 'Atory (Registered Trademark) A 2 gas transmission analyzer unit. Test specimens are clamped in diffusion cells. The bottom side of the cell is purged with a carrier gas such as belium for 3 minutes, and a diffusion cell is then sealed for a preselected time period. The sample gas flows through the top portion of the cells in the standard gas sampling valve. At the end of the given time period, The sealed bottom side of the cells # is opened one at a time and the difused gas is swept into a GOW-MAC (Registered Trademark) thermal conductivity cell with the carrier gas. The Thermal conductivity cell sends a signal to an integrating recorder for measurement. Calibration of the gas sampling valve enables the operator to measure the thermal conductivity cell response and calculate the amount of sample gas flowing from the diffusion cell into the thermal conductivity cells.

All of the film samples had a nominal thickness of 1 mil, except for 90 gauge (0.9 mils) for Example 2. The film of Example 7 had a signifi- cantly different skin layer from the remaining examples and was produced to evaluate the adhesive resin used. All of the other films except for the film of Example 8 had outer layers based on ethylene propylene copolymer. Examples 1 and 8, having the highest amount of nylon : in the core layer exhibited excellent abuse resistance as shown by the tensile, ball burst, and instrumented impact properties. The optical properties of these films were also better than the other films.

The films of Examples 1–4 were also evaluated for their carbon dioxide transmission rate. Cheese packaging materials sometimes require a relatively high carbon dioxide transmission rate because of the genera- tion of carbon dioxide by some cheese products. At the same time, it is often desirable to control and limit the transmission of oxygen to the packaging material. The films of Examples 2, 3 and 4 demonstrated adequate oxygen transmission and carbon dioxide transmission rates to provide adequate shelf life for breathable cheese products.

Obvious modifications to the invention as described may be made by one skilled in the art without departing from the spirit and scope of the claims as presented below.

What is claimed is:

1. An oriented heat shrinkable polymeric film comprising:
   (a) a core layer comprising a polyamide; and
   (b) the outer layers comprising a blend of ethylene propylene copolymer and polypropylene;
   said film having an oxygen transmission rate of no higher than about 500 cc/square meter/24 hours/atmosphere (ASTM D 3985), and said film having a carbon dioxide transmission rate of at least about 750 cc/square meter/24 hours/atmosphere.

2. The film of claim 1 further comprising an intermediate layer, on opposite surfaces of the core layer, comprising a polymeric adhesive which bonds the core layer to each respective outer layer.

3. The film in accordance with claim 2 wherein the adhesive is a polypropylene-based carboxylic acid or acid anhydride-modified adhesive.

4. The film in accordance with claim 1 wherein polypropylene comprises between about 4 and 15% by weight of the outer layers.

5. The film according to claim 1 wherein polypropylene comprises about 8% by weight of the outer layers.

6. The film according to claim 1 wherein the film has been oriented by racking at a racking ratio of from about 3.0 to about 4.0 in both the longitudinal and transverse directions.

7. The film according to claim 1 wherein the film has been oriented by racking at a racking ratio of about 3.5 in both the longitudinal and transverse directions.

8. The film according to claim 1 wherein the ethylene propylene copolymer of the outer layers comprises between 2% and 5% by weight of ethylene comonomer.

9. The film according to claim 1 wherein the ethylene propylene copolymer of the outer layers comprises about 4% by weight of ethylene comonomer.

10. The film according to claim 1 wherein the ethylene propylene copolymer of the outer layers comprises about 5% by weight of ethylene comonomer.

11. The film according to claim 1 having longitudinal and transverse free shrink of at least 17% at 200° F.

12. The film according to claim 1 wherein the total film thickness ranges from about 0.5 to 4 mils.

13. The film according to claim 1 wherein the total film thickness ranges from about 0.5 to 2 mils.

14. The film according to claim 1 wherein the core layer comprises a blend of polyamide and ethylene vinyl alcohol copolymer.

15. A method for making a coextruded multilayer film comprising the steps of:
   (a) blending ethylene propylene copolymer and polypropylene; and
   (b) coextruding an inner layer of polyamide, two intermediate adhesive layers, and two outer layers of the blend of ethylene propylene copolymer and polypropylene.

16. The method according to claim 15 comprising the further steps of:
   (a) rapidly cooling the coextruded film;
   (b) collapsing the cooled film;
   (c) heating the collapsed film to its orientation temperature; and
   (d) stretching and orienting the heated film.

17. The method according to claim 16 wherein the heated tape is stretched at a racking ratio of from about 3.0 to about 4.0 in both the longitudinal and transverse dimensions.

18. The method according to claim 16 wherein the heated tape is stretched at a racking ratio of about 3.5 in both the longitudinal and transverse directions.

19. The method according to claim 16 further comprising the step of reheating the oriented film to a temperature near its orientation temperature.

* * * * *